(12) United States Patent
Georgin et al.

(10) Patent No.: US 10,807,585 B2
(45) Date of Patent: Oct. 20, 2020

(54) PERFORMING BRAKE TESTING IN FLIGHT ON APPROACH WITH A BRAKE CONTROL SYSTEM

(71) Applicant: GOODRICH CORPORATION, Charlotte, NC (US)

(72) Inventors: Marc Georgin, Dayton, OH (US); Paul R. Burte, Clayton, OH (US)

(73) Assignee: GOODRICH CORPORATION, Charlotte, NC (US)

( * ) Notice: Subject to any disclaimer, the term of this patent is extended or adjusted under 35 U.S.C. 154(b) by 158 days.

(21) Appl. No.: 16/220,537

(22) Filed: Dec. 14, 2018

(65) Prior Publication Data

US 2020/0189552 A1 Jun. 18, 2020

(51) Int. Cl.
| | |
|---|---|
| *B60T 17/22* | (2006.01) |
| *B64F 5/60* | (2017.01) |
| *B60T 8/17* | (2006.01) |
| *B64C 25/42* | (2006.01) |

(52) U.S. Cl.
CPC .......... *B60T 17/221* (2013.01); *B60T 8/1703* (2013.01); *B64C 25/42* (2013.01); *B64F 5/60* (2017.01); *B60T 2270/406* (2013.01)

(58) Field of Classification Search
CPC ..... B60T 17/221; B60T 2270/406; B64F 5/60
USPC .................................................. 73/121, 129
See application file for complete search history.

(56) References Cited

U.S. PATENT DOCUMENTS

| 5,104,063 | A | 4/1992 | Hartley | |
|---|---|---|---|---|
| 8,463,462 | B2 * | 6/2013 | Cahill | ............. B60T 17/221 |
| | | | | 701/3 |
| 2010/0292889 | A1 | 11/2010 | Cahill et al. | |
| 2013/0060404 | A1* | 3/2013 | Cahill | ............. B60T 17/221 |
| | | | | 701/3 |
| 2015/0243113 | A1* | 8/2015 | Cahill | ............... G01L 5/28 |
| | | | | 701/32.8 |
| 2015/0344017 | A1* | 12/2015 | Cahill | ............. B60T 17/221 |
| | | | | 701/3 |
| 2017/0174201 | A1* | 6/2017 | Georgin | ............. B64C 25/42 |
| 2018/0326955 | A1* | 11/2018 | Georgin | ............. B60W 10/188 |
| 2019/0232937 | A1* | 8/2019 | Georgin | ............. B60T 8/885 |

(Continued)

FOREIGN PATENT DOCUMENTS

| EP | 2565093 | 3/2013 |
|---|---|---|
| EP | 2910440 | 8/2015 |
| EP | 2949524 | 12/2015 |

OTHER PUBLICATIONS

European Patent Office, European Search Report dated Apr. 6, 2020 in Application No. 19216577.7.

*Primary Examiner* — Eric S. McCall
(74) *Attorney, Agent, or Firm* — Snell & Wilmer LLP (57) ABSTRACT

A system for performing brake testing during flight of an aircraft, in accordance with various embodiments, includes a landing gear having at least one wheel assembly. The system further includes a brake configured to apply a braking force to the at least one wheel assembly. The system further includes a brake controller configured to determine a landing event indicating that the aircraft is approaching a landing, control the brake to apply a testing brake force to the at least one wheel assembly in response to determining the landing event, and determine an operational status of the brake based on the testing brake force.

14 Claims, 5 Drawing Sheets

(56) References Cited

U.S. PATENT DOCUMENTS

2020/0172066 A1* 6/2020 Burte .................... B64C 25/426
2020/0172077 A1* 6/2020 Burte ..................... B64C 25/42

* cited by examiner

PERFORMING BRAKE TESTING IN FLIGHT ON APPROACH WITH A BRAKE CONTROL SYSTEM

FIELD

The present disclosure relates to control systems and methods for controlling an aircraft brake to perform a brake test in flight.

BACKGROUND

Many aircraft include landing gear having wheel assemblies to allow the aircraft to travel along the ground during taxi, takeoff, and landing. It may be desirable for aircraft to be capable of braking via the landing gear wheel assemblies. In that regard, aircraft may further include brakes for providing such braking. These brakes are often controlled by a brake control unit (BCU). Occasionally, pilots will control the brakes to perform a brake test prior to making a landing. However, it is desirable to provide workload-reducing features for pilots.

SUMMARY

A system for performing brake testing during flight of an aircraft, in accordance with various embodiments, includes a landing gear having at least one wheel assembly. The system further includes a brake configured to apply a braking force to the at least one wheel assembly. The system further includes a brake controller configured to determine a landing event indicating that the aircraft is approaching a landing, control the brake to apply a testing brake force to the at least one wheel assembly in response to determining the landing event, and determine an operational status of the brake based on the testing brake force.

Any of the foregoing embodiments may further include a landing gear input device configured to receive user input corresponding to a request to extend the landing gear, wherein the brake controller is configured to determine the landing event in response to the landing gear input device receiving the user input corresponding to the request to extend the landing gear.

In any of the foregoing embodiments, the brake controller is configured to control the brake to apply the testing brake force to the at least one wheel assembly for a predetermined amount of time that is less than an amount of time that the landing gear is extending.

Any of the foregoing embodiments may further include a throttle configured to receive a power request corresponding to a desired amount of power to be provided to the aircraft, wherein the brake controller is configured to control the brake to apply the testing brake force in response to both the throttle receiving the power request and the brake controller determining the landing event.

In any of the foregoing embodiments, the brake controller is further configured to determine an altitude of the aircraft, and to control the brake to apply the testing brake force in response to both the altitude of the aircraft maintaining above a threshold altitude and the brake controller determining the landing event.

In any of the foregoing embodiments, the brake controller is further configured to determine whether the landing gear is in a locked state or an unlocked state, and to control the brake to apply the testing brake force in response to both the landing gear being in the unlocked state and the brake controller determining the landing event.

In any of the foregoing embodiments, the brake controller includes an interlock function configured to receive a gear retract instruction corresponding to an instruction to retract the landing gear; and control hydraulic power supply to a brake actuator to allow application of pressure to the at least one wheel assembly in response to both receiving the gear retract instruction and the landing gear being in the unlocked state.

In any of the foregoing embodiments, the interlock function is further configured to control the hydraulic power supply to the brake actuator to allow application of the testing brake force in response to both the landing gear being in the unlocked state and the brake controller determining the landing event.

A system for performing brake testing during flight of an aircraft, in accordance with various embodiments, includes a landing gear having at least one wheel assembly. The system further includes a landing gear input device configured to receive user input corresponding to a request to extend the landing gear. The system further includes a brake configured to apply a braking force to the at least one wheel assembly. The system further includes a brake controller configured to determine a landing event in response to the landing gear input device receiving the user input corresponding to the request to extend the landing gear, control the brake to apply a testing brake force to the at least one wheel assembly in response to determining the landing event, and determine an operational status of the brake based on the testing brake force.

In any of the foregoing embodiments, the brake controller is configured to control the brake to apply the testing brake force to the at least one wheel assembly for a predetermined amount of time that is less than an amount of time that the landing gear is extending.

Any of the foregoing embodiments may further include a throttle configured to receive a power request corresponding to a desired amount of power to be provided to the aircraft, wherein the brake controller is configured to control the brake to apply the testing brake force in response to both the throttle receiving the power request and the brake controller determining the landing event.

In any of the foregoing embodiments, the brake controller is further configured to determine an altitude of the aircraft, and to control the brake to apply the testing brake force in response to both the altitude of the aircraft maintaining above a threshold altitude and the brake controller determining the landing event.

In any of the foregoing embodiments, the brake controller is further configured to determine whether the landing gear is in a locked state or an unlocked state, and to control the brake to apply the testing brake force in response to both the landing gear being in the unlocked state and the brake controller determining the landing event.

In any of the foregoing embodiments, the brake controller includes an interlock function configured to receive a gear retract instruction corresponding to an instruction to retract the landing gear; and control hydraulic power supply to a brake actuator to allow application of pressure to the at least one wheel assembly in response to both receiving the gear retract instruction and the landing gear being in the unlocked state.

In any of the foregoing embodiments, the interlock function is further configured to control the hydraulic power supply to the brake actuator to allow application of the testing brake force in response to both the landing gear being in the unlocked state and the brake controller determining the landing event.

A method for performing brake testing during flight of an aircraft, in accordance with various embodiments, includes determining, by a brake controller, a landing event indicating that the aircraft is approaching a landing. The method further includes controlling, by the brake controller, a brake to apply a testing brake force to at least one wheel assembly in response to determining the landing event. The method further includes determining, by the brake controller, an operational status of the brake based on the testing brake force.

Any of the foregoing embodiments may further include receiving, by a landing gear input device, user input corresponding to a request to extend landing gear of the aircraft, wherein determining the landing event includes determining the landing event in response to the landing gear input device receiving the user input corresponding to the request to extend the landing gear.

In any of the foregoing embodiments, controlling the brake to apply the testing brake force includes controlling the brake to apply the testing brake force for a predetermined amount of time that is less than an amount of time that the landing gear is extending.

Any of the foregoing embodiments may further include receiving, by a throttle, a power request corresponding to a desired amount of power to be provided to the aircraft, wherein controlling the brake to apply the testing brake force includes controlling the brake to apply the testing brake force in response to both the brake controller determining the landing event and the throttle receiving the power request.

Any of the foregoing embodiments may further include determining, by the brake controller, whether the landing gear is in a locked state or an unlocked state, wherein controlling the brake to apply the testing brake force includes controlling the brake to apply the testing brake force in response to all of the brake controller determining the landing event, the throttle receiving the power request, and the landing gear being in the unlocked state.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosures, however, may best be obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the disclosure, it should be understood that other embodiments may be realized and that logical, chemical, and mechanical changes may be made without departing from the spirit and scope of the disclosure. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact.

Figure 1:
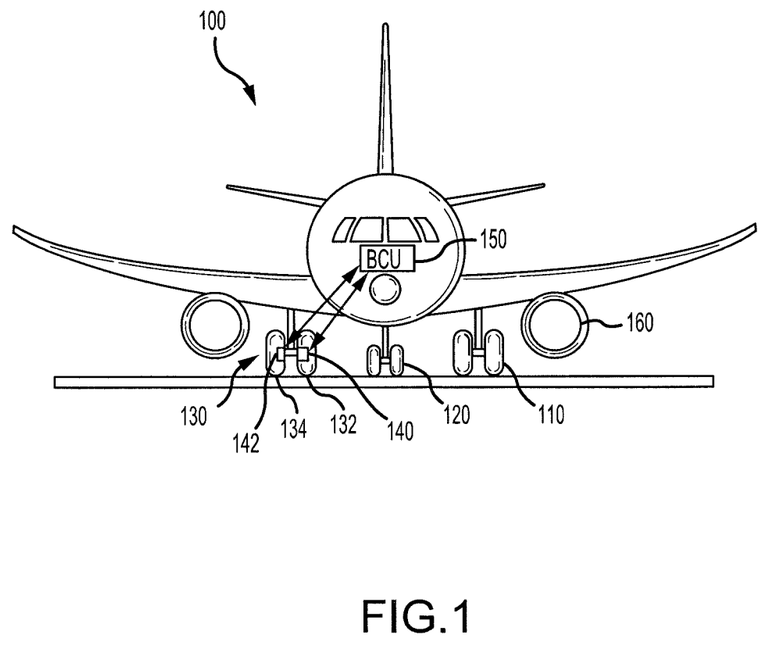
FIG. 1 illustrates an aircraft having multiple landing gear and brakes, in accordance with various embodiments.

Referring now to FIG. 1, an aircraft 100 in accordance with various embodiments can include multiple landing gear including a first landing gear 110, a second landing gear 120, and a third landing gear 130. Each landing gear may include one or more wheel assemblies. For example, the third landing gear 130 includes an inner wheel assembly 132 and an outer wheel assembly 134.

The aircraft 100 may further include one or more brake coupled to each wheel assembly. For example, a first brake 140 may be coupled to the inner wheel assembly 132, and a second brake 142 may be coupled to the outer wheel assembly 134. The first brake 140 may apply a braking force to the inner wheel assembly 132 upon receiving a brake command. Similarly, the second brake 142 may apply a braking force to the outer wheel assembly 134 upon receiving a brake command. In various embodiments, multiple brakes may apply a braking force to the inner wheel assembly 132.

The aircraft 100 may further include a brake control unit (BCU) or brake controller 150. The brake controller 150 may include one or more processors and one or more tangible, non-transitory memories and be capable of implementing logic. The processor can be a general purpose processor, a digital signal processor (DSP), an application specific integrated circuit (ASIC), a field programmable gate array (FPGA) or other programmable logic device, discrete gate or transistor logic, discrete hardware components, or any combination thereof In various embodiments, the brake controller 150 may be specifically designed for controlling operation of aircraft brakes. The brake controller 150 may control operation of the first brake 140 and the second brake 142 under normal operating conditions.

The aircraft 100 may further include one or more gas turbine engine 160. The gas turbine engine 160 may be controlled by a pilot (such as by controlling a throttle 212 in a cockpit) to generate thrust to accelerate the aircraft 100.

Figure 2:
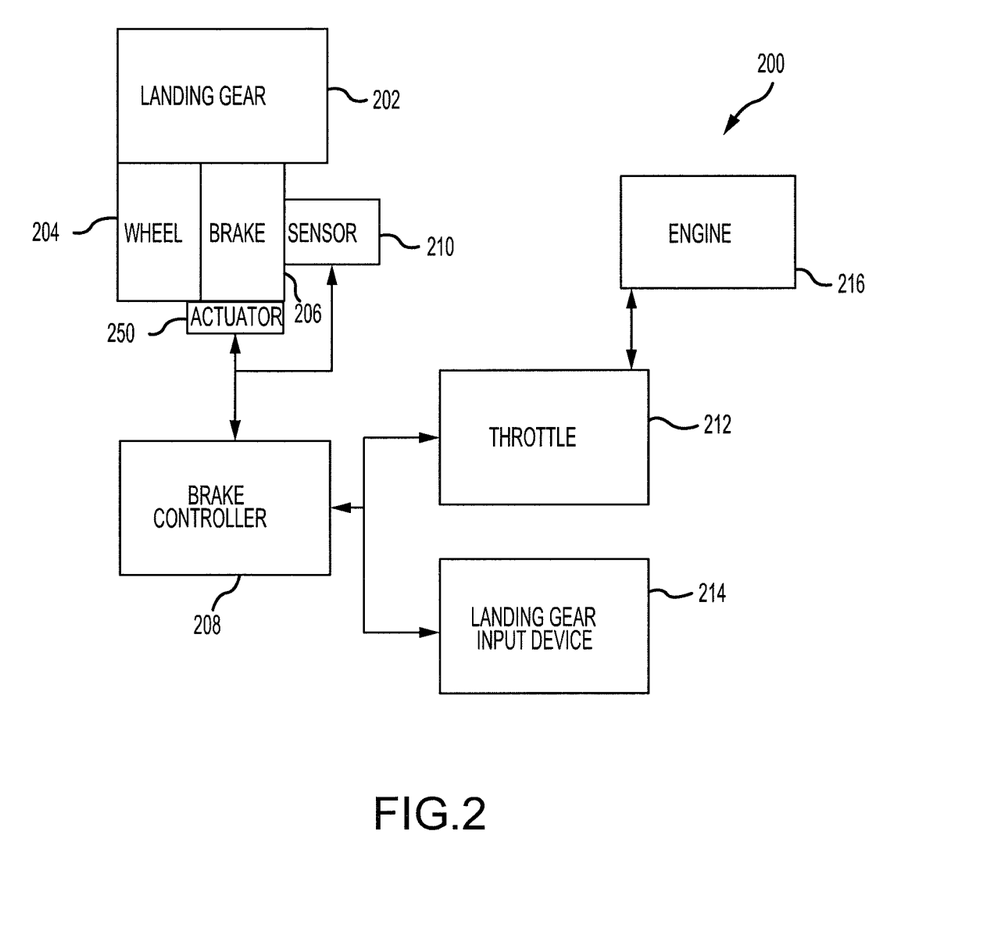
FIG. 2 illustrates a system for controlling a brake to perform a brake test in flight, in accordance with various embodiments.

Referring now to FIG. 2, a system 200 may be used to perform brake testing of an aircraft brake during flight of the aircraft. The brake testing may be performed automatically, thus acting as a workload reducing feature for pilots. The system 200 may be implemented in an aircraft such as the aircraft 100 of FIG. 1. The system 200 may include one or more landing gear 202 that includes one or more wheel or wheel assembly 204. The system 200 may further include an actuator 250 (such as a combination of servo valve and shut off valve) designed to apply pressure to a brake assembly, which may in turn apply torque to, and reduce rotational velocity of, the wheel assembly 204. The system 200 may also include a brake controller 208 designed to control operation of the actuator 250.

The system 200 may further include a sensor 210 designed to detect data that corresponds to an operational status of the brake 206. For example, the sensor 210 may detect an amount of pressure applied by the brake 206, electrical signals received from the brake 206, or the like.

The system 200 may further include a gas turbine engine 216, a throttle 212, and a landing gear input device 214. The engine 216 may generate thrust to propel a corresponding aircraft. The throttle 212 may include an input device, such as a joystick or other input device, which may be used to request power from the engine 216. For example, a pilot may use the throttle 212 to request thrust from the engine 216.

The landing gear input device 214 may include an input device which may be used to request control operation of the landing gear 202. For example, the landing gear input device 214 may include a joystick, button, or the like which a pilot may use to control the landing gear 202 to extend into an extended position or retract into a stowed position.

Figure 3:
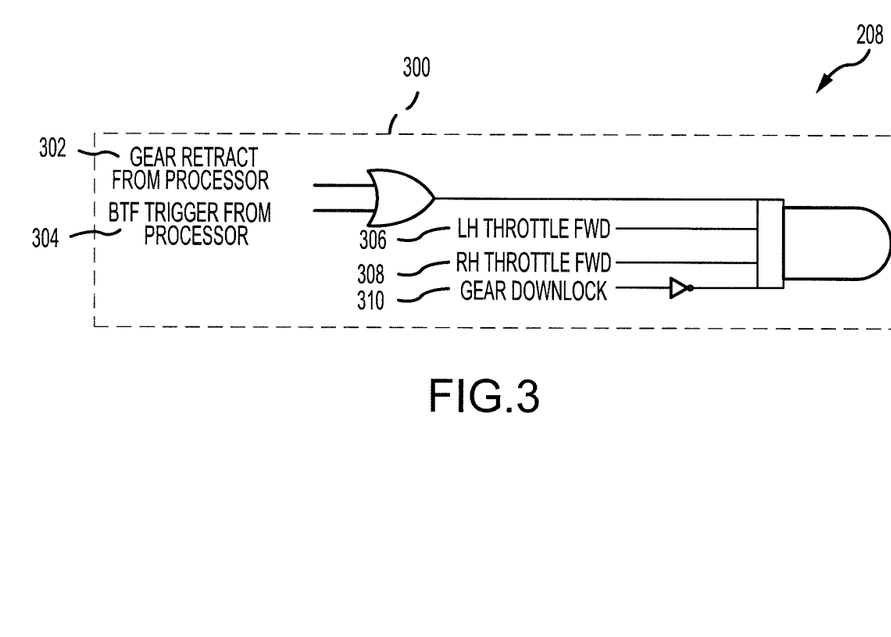
FIG. 3 illustrates an interlock function of a brake controller including brake test in flight (BTF) trigger logic, in accordance with various embodiments.

Referring now to FIGS. 2 and 3, the brake controller 208 may include logic for controlling operation of the brake 206. In particular, the brake controller 208 may include an interlock function 300. The interlock function may receive multiple inputs and may control operation of the brake based on the inputs. In particular, the interlock function 300 may control hydraulic power supply to the actuator 250, such as one or more shutoff and servo valve. The actuator 250 may apply pressure to the brake 206 as commanded by the brake controller 208. The inputs may include a gear retract command 302 such as from the landing gear input device 214. The gear retract command 302 may correspond to a request for the landing gear 202 to retract.

The inputs may further include a brake test in flight (BTF) trigger 304. The BTF trigger 304 may correspond to a landing event in which the brake controller 208 predicts that the aircraft is approaching a landing. The BTF trigger 304 may turn on in response to one or more action occurring. For example, the BTF trigger 304 may turn on in response to the brake controller 208 determining that the aircraft is approaching a landing. As another example, the BTF trigger 304 may turn on in response to the brake controller 208 receiving a signal from the landing gear input device 214 requesting the landing gear 202 to be extended. As another example, the BTF trigger 304 may turn on in response to an altitude of the aircraft maintaining above a threshold altitude in order to ensure that the brake 206 is not applying torque during landing of the aircraft. The BTF trigger 304 may turn on in response to any one or more action.

The inputs may further include a left hand throttle forward 306 and a right hand throttle forward 308. The left hand throttle forward 306 may correspond to input from the throttle 212 requesting power be generated from a left-handed engine 216, and the right hand throttle forward 308 may correspond to input from the throttle 212 requesting power be generated from a right-handed engine 216.

The inputs may also include a gear downlock signal 310. The gear downlock signal 310 may be received from the landing gear 202 in response to the landing gear 202 being locked in the extended position.

The interlock function 300 may be used to control the brake 206 to apply torque to the wheel assembly 204 in multiple situations. For example, the interlock function 300 may control a shut off valve of actuator 250 to provide hydraulic power supply to the servo valve of actuator 250. In particular, the interlock function 300 may control the shut off valve of actuator 250 to provide hydraulic power supply to the servo valve of actuator 250 in order to apply the pressure to the brake 206 in response to the gear downlock signal 310 being false, one or more throttle forward signals 306, 308 (indicating that power is requested of the engine 216), and either of the gear retract command 302 being true or the BTF trigger 304 being true. Inclusion of the gear downlock signal 310 and the throttle forward signals 306, 308 in the interlock function 300 provides protection against unwanted braking (such as when the aircraft is still on the ground before lift-off).

Conventional interlock functions have been used to control aircraft brakes to apply braking torque to wheel assemblies in response to requests for landing gear to be retracted. This reduces rotational velocity of the wheel assemblies prior to the landing gear being in the stowed position. Inclusion of the BTF trigger 304 in the interlock function 300 allows automatic testing of the brake 206 in response to the brake controller 208 determining that the aircraft is approaching a landing without requiring any hardware changes in the system 200.

Figure 4:
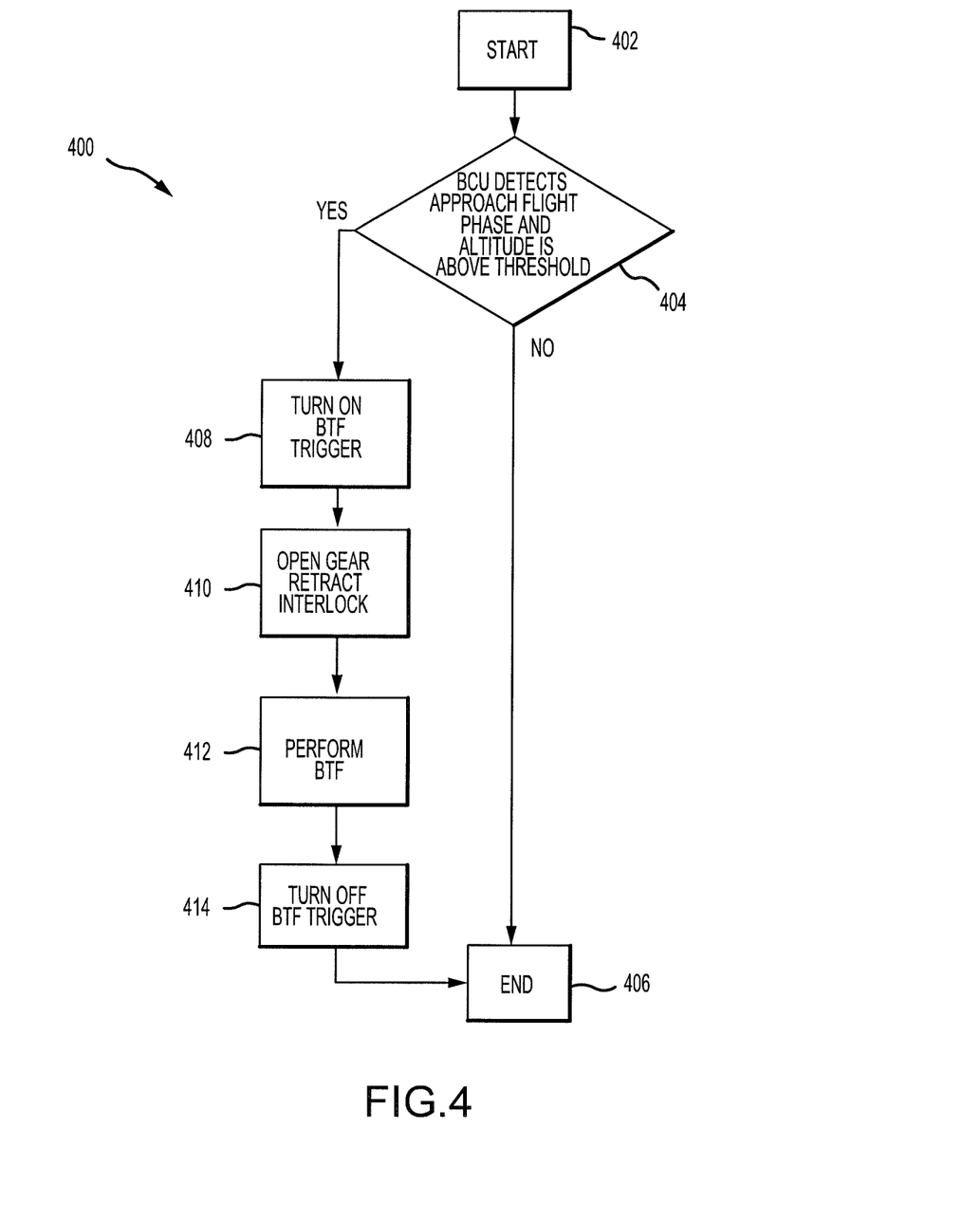
FIG. 4 illustrates a method for performing a brake test in flight, in accordance with various embodiments.

Referring now to FIG. 4, a method 400 may be used to perform a brake test during flight of an aircraft. The method 400 may start in block 402. In block 404, the brake controller may determine that a current flight phase is an approach phase, indicating that the aircraft is approaching a landing. For example, the brake controller may make this determination based on a request for landing gear of the aircraft to be extended. In block 404, the brake controller may further determine whether an altitude of the aircraft is greater than or equal to (i.e., maintaining above) a predetermined threshold altitude. The predetermined threshold altitude may correspond to an altitude at or above which it is determined that the aircraft is sufficiently far from landing. In various embodiments, the altitude of the aircraft may not be considered in block 404.

If the result of block 404 is false then the method 400 may end in block 406. Otherwise, the method 400 may proceed to block 408. In block 408, the brake controller may turn on a BTF trigger, such as the BTF trigger 304 of FIG. 3.

In block 410, a gear retract interlock function may be instantiated in the brake controller. The gear retract interlock function may be similar to the interlock function 300 of FIG. 3.

In block 412, a brake test in flight may be performed. The brake test in flight may be performed by controlling a brake to apply pressure to an aircraft wheel assembly, causing a rotational velocity of the aircraft wheel assembly to be reduced. For example, the brake test may be performed by controlling the brake to apply a pressure ramp to a predetermined pressure value, such as 1500 pounds per square inch (PSI) for a predetermined amount of time. The predetermined amount of time may be less than an amount of time that the landing gear takes to move from the retracted position to an extended position. The brake controller may analyze operation of the brake (such as by analyzing data from a sensor associated with the brake) to determine whether the brake is operational during the brake test. The brake controller may transmit a signal to the cockpit indicating an operational status of the brake at the end of the brake test in flight.

In block 414, after the brake test has been performed, the brake controller may turn off the BTF trigger.

Figure 5:
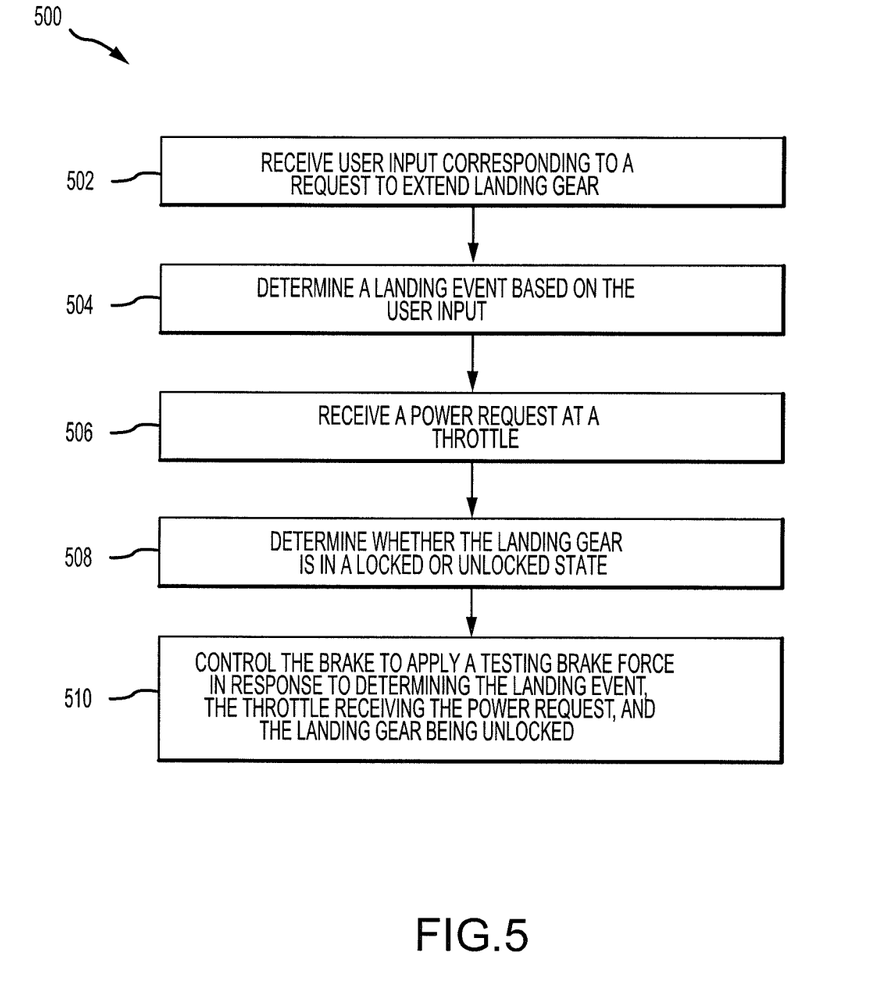
FIG. 5 illustrates a method for performing a brake test in flight, in accordance with various embodiments.

Turning now to FIG. 5, a method 500 may be performed by a brake controller to perform a brake test in flight. The brake test in flight may be a workload reducing feature for the pilot as it may be performed automatically by the brake controller while the aircraft is in flight. The method 500 may begin in block 502 where a landing gear input device may receive user input corresponding to a request to extend landing gear. For example, a pilot may provide input to the landing gear input device requesting the landing gear be extended from the stowed position to the extended position.

In block 504, the brake controller may determine a landing event based on the user input. The landing event may correspond to a determination that the aircraft is approaching a landing. For example, the brake controller may determine the landing event in response to the landing gear input device receiving the request to extend the landing gear.

In block 506, one or more throttle in the aircraft cockpit may receive a power request. The power request may correspond to a request for one or more engine of the aircraft to generate thrust.

In block 508, the brake controller may determine whether the landing gear is in a locked state or an unlocked state. In particular, the brake controller may determine whether the landing gear is locked in an extended position or is unlocked.

In block 510, the brake controller may control the brake to apply a testing brake force to the wheel assembly in response to determining the landing event, the throttle receiving the power request, and the landing gear being in the unlocked state. The brake controller may further analyze the results of the testing brake force to determine whether the brake is operational.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the disclosure. The scope of the disclosure is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "an example embodiment", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112 (f) unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A system for performing brake testing during flight of an aircraft, comprising:
    a landing gear having at least one wheel assembly;
    a brake configured to apply a braking force to the at least one wheel assembly; and
    a brake controller configured to:
        determine a landing event indicating that the aircraft is approaching a landing,
        control the brake to apply a testing brake force to the at least one wheel assembly in response to determining the landing event, and
        determine an operational status of the brake based on the testing brake force,
    wherein the brake controller is further configured to determine whether the landing gear is in at least one of a locked state or an unlocked state, and to control the brake to apply the testing brake force in response to both the landing gear being in the unlocked state and the brake controller determining the landing event, and
    wherein the brake controller includes an interlock function configured to:
        receive a gear retract instruction corresponding to an instruction to retract the landing gear;
        control hydraulic power supply to a brake actuator to allow application of pressure to the at least one wheel assembly in response to both receiving the gear retract instruction and the landing gear being in the unlocked state, and
        control the hydraulic power supply to the brake actuator to allow application of the testing brake force in response to both the landing gear being in the unlocked state and the brake controller determining the landing event.

2. The system of claim 1, further comprising a throttle configured to receive a power request corresponding to a desired amount of power to be provided to the aircraft, wherein the brake controller is configured to control the brake to apply the testing brake force in response to both the throttle receiving the power request and the brake controller determining the landing event.

3. The system of claim 1, wherein the brake controller is further configured to determine an altitude of the aircraft, and to control the brake to apply the testing brake force in response to both the altitude of the aircraft maintaining above a threshold altitude and the brake controller determining the landing event.

4. The system of claim 1, further comprising a landing gear input device configured to receive user input corresponding to a request to extend the landing gear, wherein the brake controller is configured to determine the landing event in response to the landing gear input device receiving the user input corresponding to the request to extend the landing gear.

5. The system of claim 4, wherein the brake controller is configured to control the brake to apply the testing brake force to the at least one wheel assembly for a predetermined amount of time that is less than an amount of time that the landing gear is extending.

6. A system for performing brake testing during flight of an aircraft, comprising:
   a landing gear having at least one wheel assembly;
   a landing gear input device configured to receive user input corresponding to a request to extend the landing gear;
   a brake configured to apply a braking force to the at least one wheel assembly; and
   a brake controller configured to:
      determine a landing event in response to the landing gear input device receiving the user input corresponding to the request to extend the landing gear,
      control the brake to apply a testing brake force to the at least one wheel assembly in response to determining the landing event, and
      determine an operational status of the brake based on the testing brake force,
   wherein the brake controller is further configured to determine whether the landing gear is in at least one of a locked state or an unlocked state, and to control the brake to apply the testing brake force in response to both the landing gear being in the unlocked state and the brake controller determining the landing event, and
   wherein the brake controller includes an interlock function configured to:
      receive a gear retract instruction corresponding to an instruction to retract the landing gear;
      control hydraulic power supply to a brake actuator to allow application of pressure to the at least one wheel assembly in response to both receiving the gear retract instruction and the landing gear being in the unlocked state, and
      control the hydraulic power supply to the brake actuator to allow application of the testing brake force in response to both the landing gear being in the unlocked state and the brake controller determining the landing event.

7. The system of claim 6, wherein the brake controller is configured to control the brake to apply the testing brake force to the at least one wheel assembly for a predetermined amount of time that is less than an amount of time that the landing gear is extending.

8. The system of claim 6, further comprising a throttle configured to receive a power request corresponding to a desired amount of power to be provided to the aircraft, wherein the brake controller is configured to control the brake to apply the testing brake force in response to both the throttle receiving the power request and the brake controller determining the landing event.

9. The system of claim 6, wherein the brake controller is further configured to determine an altitude of the aircraft, and to control the brake to apply the testing brake force in response to both the altitude of the aircraft maintaining above a threshold altitude and the brake controller determining the landing event.

10. A method for performing brake testing during flight of an aircraft, the method comprising:
   determining, by a brake controller, a landing event indicating that the aircraft is approaching a landing;
   controlling, by the brake controller, a brake to apply a testing brake force to at least one wheel assembly in response to determining the landing event;
   determining, by the brake controller, an operational status of the brake based on the testing brake force;
   determining, by the brake controller, the testing brake force in response to both the landing gear being in the unlocked state and the brake controller determining the landing event;
   receiving, by an interlock function of the brake controller, a gear retract instruction corresponding to an instruction to retract the landing gear;
   controlling, by the interlock function, hydraulic power supply to a brake actuator to allow application of pressure to the at least one wheel assembly in response to both receiving the gear retract instruction and the landing gear being in the unlocked state; and
   controlling, by the interlock function, the hydraulic power supply to the brake actuator to allow application of the testing brake force in response to both the landing gear being in the unlocked state and the brake controller determining the landing event.

11. The method of claim 10, further comprising receiving, by a landing gear input device, user input corresponding to a request to extend landing gear of the aircraft, wherein determining the landing event includes determining the landing event in response to the landing gear input device receiving the user input corresponding to the request to extend the landing gear.

12. The method of claim 11, wherein controlling the brake to apply the testing brake force includes controlling the brake to apply the testing brake force for a predetermined amount of time that is less than an amount of time that the landing gear is extending.

13. The method of claim 12, further comprising receiving, by a throttle, a power request corresponding to a desired amount of power to be provided to the aircraft, wherein controlling the brake to apply the testing brake force includes controlling the brake to apply the testing brake force in response to both the brake controller determining the landing event and the throttle receiving the power request.

14. The method of claim 13, wherein controlling the brake to apply the testing brake force includes controlling the brake to apply the testing brake force in response to all of the brake controller determining the landing event, the throttle receiving the power request, and the landing gear being in the unlocked state.

* * * * *